Patented June 23, 1931

1,811,535

UNITED STATES PATENT OFFICE

HYYM E. BUC, OF ROSELLE, AND HOWARD R. TATE, OF ELIZABETH, NEW JERSEY, ASSIGNORS TO STANDARD OIL DEVELOPMENT COMPANY, A CORPORATION OF DELAWARE

PROCESSES FOR PURIFICATION OF OIL SOLUBLE SODIUM SULPHONATES

No Drawing. Application filed November 19, 1927. Serial No. 234,548.

This invention relates to the manufacture of oil soluble sodium sulphonates and will be understood from the following description:

When petroleum distillates and particularly lubricating distillates are treated with fuming sulphuric acid or sulphuric anhydride, certain acids are formed and are found in the oil phase at the expiration of the treatment. These acids are characterized by the presence of sulphur in combination and are predominantly oil soluble. For the purposes of this application they are termed oil soluble sulphonic acids and the metallic derivatives thereof oil soluble sulphonates. These acids are ordinarily neutralized to form oil soluble sodium sulphonate and extracted from the oil phase by the use of a selective solvent such as a mixture of alcohol and water. After the extraction and separation from the oil of the solvent containing dissolved sulphonate, the same is heated to recover the solvent by distillation, leaving a residue of crude oil soluble sodium sulphonate together with some petroleum oil.

The crude oil soluble sulphonate so obtained is then further purified by solution in organic solvents such as strong ethyl or isopropyl alcohol, say 75% or higher gravimetric alcoholic concentration, in which inorganic impurities are insoluble. Isopropyl alcohol is preferably employed for this purpose. After settling and/or filtration to eliminate inorganic impurities, the solution so obtained is evaporated for the recovery of the solvent and the production of a purified oil soluble sulphonate. The oil soluble sulphonate, when properly prepared, is an excellent agent for the stabilization of emulsions of petroleum oils in water; during this heating for evaporation, however, a darkening and deterioration of the oil soluble sulphonate frequently occurs which deterioration is evidenced by a diminution in emulsifying power.

We have found that an improved product may be obtained by conducting the said evaporation in the presence of a small proportion of the alkali metal salt of a weak organic acid. The salts referred to are those, the aqueous solution of which react alkaline such as the naphthenates, resinates and soaps or salts of aliphatic acids and which salts are capable of forming either true or colloidal solutions with petroleum lubricating oils. The sodium salt of rosin has been found to be very suitable for this purpose.

In practicing the process we may add the sodium salt of the weak organic acid or we may add the weak organic acid and base either simultaneously or separately in combining proportions at any time prior to the final stage of the evaporation.

We preferably incorporate from one to ten percent of the sodium salt of the weak organic acid in proportion to the total amount of oil soluble sodium sulphonate present.

The residue of sodium sulphonate and sodium resinate or the like from the evaporation of the solution, to which the salt has been added as described, will be free from the deterioration which otherwise frequently occurs on heating.

It will be understood that the foregoing description is in illustration and not in limitation; among other things, the process may be employed in the manufacture of any oil soluble sulphonate of the sodium group. Various alternatives may be adopted within the scope of the appended claims in which it is our intention to claim broadly all novelty inherent in the invention.

We claim:

1. The process of preparing a non-deteriorated sodium salt of an oil soluble sulphonic acid derived from the treatment of petroleum oil with fuming sulphuric acid or sulphuric anhydride, which comprises dissolving the salt in an organic solvent in which inorganic materials are relatively insoluble and evaporating the solution so obtained in the presence of the sodium salt of a weak organic acid, which salt is capable of forming either a true or colloidal solution with petroleum lubricating oil, to recover the solvent and produce a residue of non-deteriorated oil soluble sodium sulphonate mixed with the added salt of the weak organic acid.

2. Process according to claim 1 in which the salt of a weak organic acid present is the sodium salt of rosin.

3. Process according to claim 1 in which the organic solvent is a solution of isopropyl alcohol.

4. Process according to claim 1 in which the sodium salt of a weak organic acid is present in the proportion of 1 to 10% of the oil soluble sulphonate present.

5. The process of preparing a non-deteriorated sodium salt of an oil soluble solphonic acid derived from the treatment of petroleum oil with fuming sulphuric acid or sulphuric anhydride, which comprises dissolving the salt in an organic solvent in which inorganic materials are relatively insoluble to separate the inorganic material, removing the alcoholic solution from the separated inorganic material, and evaporating the solution so obtained in the presence of the sodium salt of a weak organic acid which salt is capable of forming either a true or colloidal solution with petroleum lubricating oil to recover the solvent and produce a residue of non-deteriorated oil soluble sulphonate mixed with the added salt of the weak organic acid.

6. The process of preparing a non-deteriorated sodium salt of an oil soluble sulphonic acid derived from the treatment of petroleum oil with fuming sulphuric acid or sulphuric anhydride, which comprises dissolving the salt in an organic solvent in which inorganic materials are relatively insoluble and evaporating the solution so obtained in the presence of an alkali metal salt of a weak organic acid, which salt is capable of forming either a true or colloidal solution with petroleum lubricating oil, to recover the solvent and produce a residue of non-deteriorated oil soluble sodium sulphonate mixed with the added salt of the weak organic acid.

HYYM E. BUC.
HOWARD R. TATE